Feb. 14, 1933.  H. C. DRAKE  1,897,610
FLAW DETECTOR
Filed Dec. 30, 1931
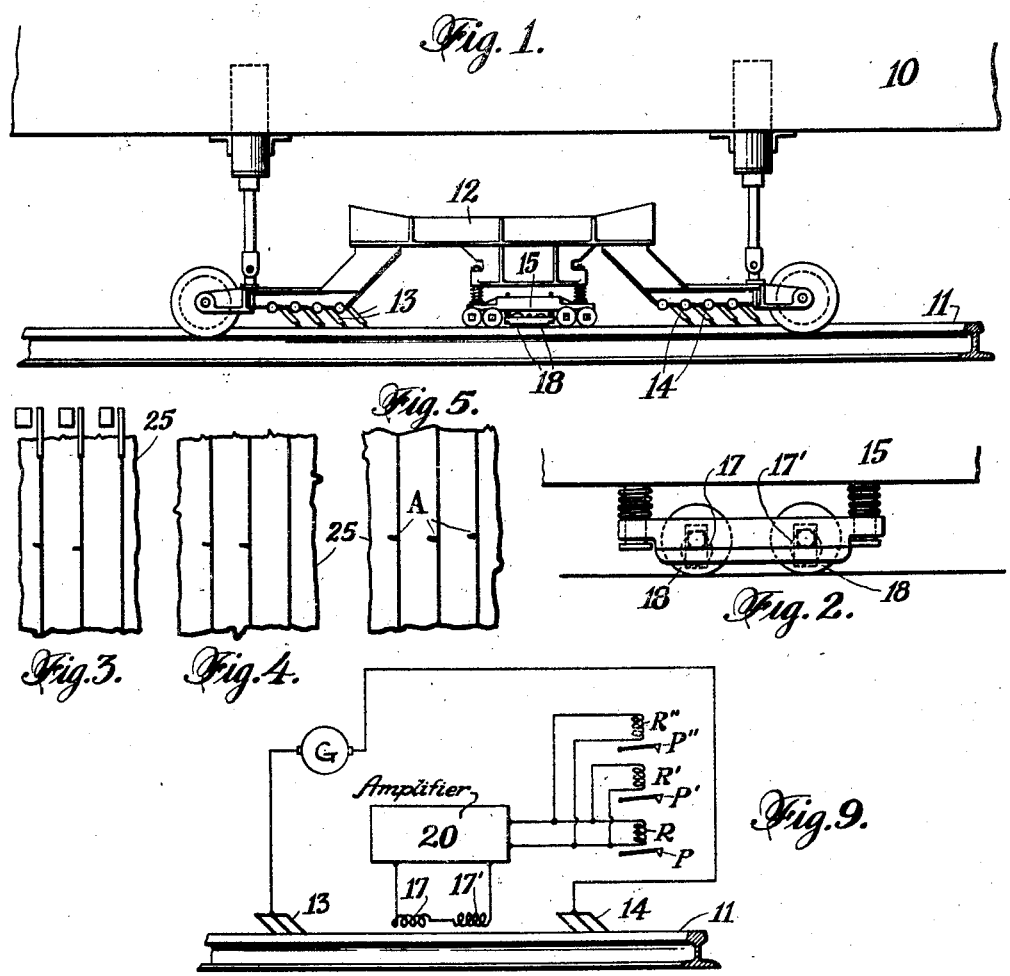
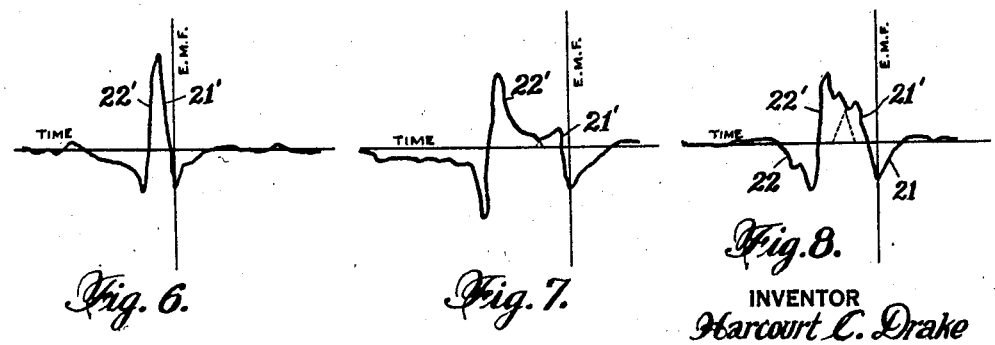
INVENTOR
Harcourt C. Drake
BY
ATTORNEY Patented Feb. 14, 1933

1,897,610

UNITED STATES PATENT OFFICE

HARCOURT C. DRAKE, OF HEMPSTEAD, NEW YORK, ASSIGNOR TO SPERRY PRODUCTS, INC., OF BROOKLYN, NEW YORK, A CORPORATION OF NEW YORK

FLAW DETECTOR

Application filed December 30, 1931. Serial No. 583,854.

This invention relates to rail flaw detectors of the type disclosed in the patent to E. A. Sperry, No. 1,820,505 granted August 25th, 1931. The principle disclosed in said patent consists in energizing the rail or other conductor under test by means of a heavy current supplied from the generator in order to establish an electromagnetic field surrounding the conductor. A pair of opposed induction coils is moved along the conductor out of contact therewith so that normally they cut the same number of lines of force and hence the E. M. F.'s induced by the coils cancel out. Similarly, any variations in current supply will cause equal and opposite effects on the coils so that no operation of the indicator is obtained. When, however, a flaw is encountered, the coils, being arranged in tandem, will generate a differential E. M. F. because the first coil will strike the region of the flaw before the second coil and will therefore cut a different number of lines of force than the second coil. After the said first coil has passed beyond the region of the flaw, the second coil will enter said region and will also cut a different number of lines of force than the first coil. As a result of this movement, there are generated two cycles of induced voltage, one by the first coil, said cycle consisting of a positive and negative impulse, and one by the second coil, the cycle of the second coil consisting of a negative and positive impulse.

The coils have heretofore been positioned fairly closely but without any underlying scientific principle governing their relative spacing. Applicant discovered a principle of relative positioning of the coils which resulted in much improved operation of the flaw detector, especially in the case of the Sperry rail flaw detector cars. This principle will be fully disclosed in the following specification.

In the accompanying drawing,

Fig. 1 is a side elevation of a portion of a Sperry rail flaw detector car with the rail flaw detector mechanism supported thereon.

Fig. 2 is an enlarged view of the detector unit showing the ends of the detector coil in dotted lines.

Figs. 3, 4, and 5 are portions of actual record tapes made from the same stretch of track but with close spacing, wide spacing, and intermediate spacing, respectively, of the detector coils.

Figs. 6, 7 and 8 are oscillographs giving a graphic representation of the generated E. M. F.'s caused by the coils passing over the same rail fissure, employing close, wide, and intermediate spacing, respectively, of the detector coils.

Fig. 9 is a simplified wiring diagram of the circuit employed in the rail flaw detecting mechanism.

Referring to the drawing, there is shown in Fig. 1 a portion of a Sperry rail flaw detector car 10 from which is suspended the rail flow detecting mechanism which is shown in engagement with a rail 11. This mechanism comprises a current brush carriage 12 having a series of brushes 13, 14 for passing current into and out of the rail, the said current being delivered by the generator G within the car body. On the current brush carriage 12 there is mounted for independent movement a detector unit 15 which may be provided with rollers to engage the track and supporting a pair of detector coils 17, 17' shown in dotted lines in Fig. 2 within cylindrical casings 18. As shown in the wiring diagram in Fig. 9, the coils are arranged in tandem and in opposition to each other so that normally they cut the same number of lines of force and do not transmit any differential E. M. F. to the amplifier 20. But when a flaw is encountered, the first coil 17 will cut a different number of lines of force than coil 17' and generate a differential E. M. F. which is shown in Fig. 8 as comprising the negative portion 21 and a positive portion 21'. As the coil 17' approaches the region of the flaw it will cut a different number of lines of force than coil 17 which is now cutting the normal number of lines of force, and a second cycle will be generated comprising a positive portion 22' and a negative portion 22. The differential E. M. F., after being amplified in the amplifier 20, is caused to operate an indicating mechanism which in this case is a pen P operating on chart 25, shown in Figs 3 to 5. A series of relays R, R', R"

may be provided to operate pens P, P', P", said relays being arranged of progressively increasing strength so that for a small output from the amplifier, only pen P will be operated, while a stronger output will operate pens P and P' and a still stronger output will operate all three pens.

Applicant conceived the idea of so positioning the coils relative to each other that the effective output of the second coil would reinforce the effective output of the first coil. Thus, for instance, in the case of flaw A shown on Fig. 5, he found that while with a a certain spacing of the coils he obtained a three-pen indication on the record tape, he obtained only two-pen indications on the record tapes of Figs. 3 and 4. The spacing between the axes of the coils employed in making the record tape of Fig. 3 was 1⅝". The spacing between the axes of the coils employed in making the record tape of Fig. 4 was 4⅜", while the spacing for the record of Fig. 5 was 3".

With the above three spacings of detector coils, oscillographs were made of the cycles generated when the coils passed over the same flaw. These graphs are shown in Figs. 6, 7 and 8 and correspond to the condition of the coils employed in making the record tapes of Figs. 3, 4 and 5, respectively. These graphs are plotted with E. M. F. shown as ordinates and time as the abscissa.

These graphs confirm applicant's theory which can best be explained by reference first to Fig. 8. In this figure, it will be seen that a substantial E. M. F. is generated and continued for considerable period to give a large and enduring impulse which after being amplified gave a large enough output to operate more pens than in the case of the other two settings of the detector coils. It will be seen that the cycle generated by the first coil 17 has a negative portion 21 and a positive portion 21' and that the cycle generated by coil 17' has a positive portion 22' and a negative portion 22. It will also be seen that a considerable time before the positive impulse 21' is completed as shown by dotted lines, in fact while the positive impulse 21' is still at its peak, the positive impulse 22' which has begun a considerable time before has also nearly reached its peak and thus continues the maximum impulse of 21' throughout the positive portion 22' of the cycle generated by the next coil.

This, it will be seen, is not the case in the Fig. 6 graph where the coils were spaced closer together so that the positive portion 22' of the cycle generated by coil 17' coincides with the positive portion 21' of the cycle generated by coil 17. As a result, there is obtained a voltage that is somewhat higher than the maximum positive voltage of Fig. 8 but of very short duration.

A different result has been obtained in Fig. 7 wherein the coils were spaced far apart. Here it will be seen that the positive portion 21' of impulse generated by coil 17 is practically completed before the positive impulse 22' of the cycle generated by coil 17' has begun. There is, therefore, a small peek, then a depression, and then another peek, both peeks being of relatively short duration.

Since the positioning of the coils which resulted in the graph shown in Fig. 8 and the record tape of Fig. 5 is clearly the most desirable, it confirms applicant's principle, which may be summed up as follows: That the positioning of the coils which will yield the best results is the one wherein the coils are so positioned relative to each other that the maximum voltage induced by the second half of the cycle generated by the first coil is continued substantially throughout the first half of the cycle generated by the second coil. Thus, the second half of the cycle generated by coil 17 for Fig. 8 is 21' and the maximum voltage of this cycle is continued through the first half 22' of the cycle generated by the second coil 17'. In both Figs. 6 and 7, there is a clear failure of the first half of the succeeding coil to continue the maximum voltage generated by the second half of the first cycle. In Fig. 6, these two portions of the cycles overlap so that there is no, or substantially no, continuation of one by the other. Similarly, in Fig. 7 these two portions are so separated that one is practically complete before the other begins, so that there is no continuation of the maximum voltage generated by the last half of the first cycle.

It will be understood that the graphs shown in Figs. 6, 7 and 8 relate to a certain speed of travel of the detector unit over the conductor. Thus, Fig. 8 indicates the most desirable relative positioning of the coils for a speed of six miles per hour. It is understood that the detector mechanism is always operated at a constant speed. Should this speed be increased to a constant speed of eight miles an hour, for instance, or should the size of the coils be changed, a somewhat different positioning of the coils would be necessary, but applicant's principle outlined above would still apply, namely, that the first half of the cycle generated by the second coil would come in at such point as to continue the maximum voltage generated in the last half of the cycle generated by the first coil.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a flaw detector mechanism for electrical conductors, said mechanism including means for sending current through the conductor to establish an electromagnetic field, a pair of detector coils adapted to traverse said field, said coils being so positioned relative to each other that the differential E. M. F. generated when one coil passes through a region of flaw reinforces and extends the differential E. M. F. generated when the other coil passes through said region.

2. In a flaw detector mechanism for electrical conductors, said mechanism including means for sending current through the conductor to establish an electromagnetic field, a pair of detector coils adapted to traverse said field, said coils being so positioned relative to each other that the maximum differential E. M. F. generated when one coil passes through a region of flaw reinforces and extends the differential E. M. F. generated when the other coil passes through said region.

3. In a flaw detector mechanism for electrical conductors, said mechanism including means for sending current through the conductor to establish an electromagnetic field, a pair of opposed detector coils adapted to traverse said field, an amplifier for amplifying the differential E. M. F.'s induced by said coils, said coils being so positioned relative to each other that the maximum output of said amplifier due to the differential E. M. F. generated when one coil passes through a region of flaw reinforces and extends the output of said amplifier due to the differential E. M. F. generated when the other coil passes through said region.

4. In a flaw detector mechanism for electrical conductors, said mechanism including means for sending current through the conductor to establish an electromagnetic field, a pair of detector coils arranged to generate cycles of differential E. M. F. on passing through a region of flaw, said coils being so positioned relative to each other that the cycle generated when the second coil passes through a defective region overlaps the cycle generated when the first coil passes through said region to an extent to cause reinforcing and extending of the output of said first cycle.

5. In a flaw detector mechanism for electrical conductors, said mechanism including means for sending current through the conductor to establish an electromagnetic field, a pair of detector coils arranged to generate cycles of differential E. M. F. on passing through a region of flaw, said coils being so positioned relative to each other that the cycle generated when the second coil passes through a defective region overlaps the cycle generated when the first coil passes through said region to an extent to cause reinforcing and extending of the maximum output of said first cycle.

6. In a flaw detector mechanism for electrical conductors, said mechanism including means for sending current through the conductor to establish an electromagnetic field, a pair of opposed detector coils arranged to generate cycles of differential E. M. F. on passing through a region of flaw, said coils being so positioned relative to each other that the first half of the cycle generated when the second coil passes through said region overlaps the second half of the cycle generated when the first coil passes through said region.

7. In a flaw detector mechanism for electrical conductors, said mechanism including means for sending current through the conductor to establish an electromagnetic field, a pair of opposed detector coils arranged to generate cycles of differential E. M. F. on passing through a region of flaw, said coils being so positioned relative to each other that the second half of the cycle generated when the first coil passes through said region is overlapped by the first half of the cycle generated when the second coil passes through said region to such extent as to reinforce and extend the maximum output of said second half of the first cycle substantially throughout said first half of the second cycle.

In testimony whereof I affix my signature.

HARCOURT C. DRAKE.